United States Patent
Kalinowski (10) Patent No.: US 10,239,430 B2
(45) Date of Patent: Mar. 26, 2019

(54) VEHICLE SEAT AND AIRBAG STRUCTURE

(71) Applicant: Nissan North America, Inc., Franklin, TN (US)

(72) Inventor: David Kalinowski, Milford, MI (US)

(73) Assignee: Nissan North America, Inc., Franklin, TN (US)

( * ) Notice: Subject to any disclaimer, the term of this patent is extended or adjusted under 35 U.S.C. 154(b) by 89 days.

(21) Appl. No.: 15/279,183

(22) Filed: Sep. 28, 2016

(65) Prior Publication Data
US 2018/0086299 A1    Mar. 29, 2018

(51) Int. Cl.
| | |
|---|---|
| *B60N 2/68* | (2006.01) |
| *B60N 2/58* | (2006.01) |
| *B60N 2/64* | (2006.01) |
| *B60R 21/21* | (2011.01) |
| *B60R 21/16* | (2006.01) |
| *B60R 21/231* | (2011.01) |

(52) U.S. Cl.
CPC .............. *B60N 2/68* (2013.01); *B60N 2/58* (2013.01); *B60N 2/64* (2013.01); *B60R 21/21* (2013.01); *B60N 2002/5808* (2013.01); *B60R 2021/161* (2013.01); *B60R 2021/23153* (2013.01)

(58) Field of Classification Search
CPC ............ B60R 21/207; B60R 2021/161
See application file for complete search history.

(56) References Cited

U.S. PATENT DOCUMENTS

| | | |
|---|---|---|
| 5,651,582 A | 7/1997 | Nakano |
| 6,045,151 A | 4/2000 | Wu |
| 8,939,464 B2 | 1/2015 | Acker et al. |
| 2006/0186652 A1 | 8/2006 | Sunabashiri |
| 2013/0009431 A1* | 1/2013 | Acker .................. B60R 21/207 297/216.13 |

(Continued)

FOREIGN PATENT DOCUMENTS

| | | | |
|---|---|---|---|
| DE | 102006005137 A1 * | 8/2007 | ........... B60R 21/207 |
| DE | 102009016885 A1 | 10/2010 | |

(Continued)

OTHER PUBLICATIONS

Hiromitsu Ogasawara, Seat Back Structure for Seat With Built-In Side Air Bag, Nov. 24, 1998, EPO, JP 10-310017 A, English Abstract (Year: 1998).*

(Continued)

*Primary Examiner* — James A English
(74) *Attorney, Agent, or Firm* — Global IP Counselors, LLP (57) ABSTRACT

An airbag assembly includes an attachment bracket, an inflatable airbag and a deployment device. The attachment bracket is attached to an outboard bolster section of a seat assembly. The attachment bracket defines an attachment section that extends along an inboard surface of the outboard bolster section and a deflection surface extending from the attachment section with the inflatable airbag. The deployment section is attached to an inboard side of the attachment section. The deflection surface is dimensioned and shaped such that upon deployment of the inflatable airbag the inflatable airbag is guided to move by the deflection surface in a forward deployment direction relative to the outboard bolster section.

17 Claims, 8 Drawing Sheets

(56) References Cited

U.S. PATENT DOCUMENTS

| | | | |
|---|---|---|---|
| 2013/0200599 A1* | 8/2013 | Shamoto | B60N 2/289 |
| | | | 280/730.2 |
| 2014/0339796 A1 | 11/2014 | Zucal | |
| 2015/0151711 A1* | 6/2015 | Fujiwara | B60R 21/207 |
| | | | 280/728.2 |
| 2016/0121761 A1* | 5/2016 | Nishide | B60N 2/2222 |
| | | | 297/284.3 |
| 2017/0129441 A1* | 5/2017 | Murthy | B60R 21/207 |

FOREIGN PATENT DOCUMENTS

| | | |
|---|---|---|
| DE | 102010051521 A1 | 5/2012 |
| DE | 102012221204 A1 | 5/2014 |
| DE | 102013017346 A1 | 7/2014 |
| JP | 10310017 A * | 11/1998 |

OTHER PUBLICATIONS

Hiromitsu Ogasawara, Seat Back Structure for Seat With Built-In Side Air Bag, Nov. 24, 1998, EPO, JP 10-310017 A, Machine Translation of Description (Year: 1998).*

Nordberg et al., Vehicle seating for automobile, has cushioned backrest that has reclining tie bars on its longitudinal side of cushioning and reclining tie bars are formed in travel direction towards front, Aug. 9, 2007, EPO, DE 10 2006 005 137 A1, English Abstract (Year: 2007).*

Nordberg et al., Vehicle seating for automobile, has cushioned backrest that has reclining tie bars on its longitudinal side of cushioning and reclining tie bars are formed in travel direction towards front, Aug. 9, 2007, EPO, DE 10 2006 005 137 A1, Machine Translation of Description (Year: 2007).*

* cited by examiner

VEHICLE SEAT AND AIRBAG STRUCTURE

BACKGROUND

Field of the Invention

The present invention generally relates to rear vehicle seat having an airbag structure installed therein. More specifically, the present invention relates to a rear vehicle seat with an airbag structure that includes a deflection surface that directs movement of an inflatable airbag during inflation.

Background Information

Airbags are installed in many different locations within a vehicle.

SUMMARY

One object of the present disclosure is to provide a bolster section of a rear seat assembly with an airbag assembly.

Another object of the present disclosure is to provide a bolster section of a rear seat assembly with an airbag assembly that deploys in a vehicle forward direction.

In view of the state of the known technology, one aspect of the present disclosure is to provide a vehicle seat and airbag structure with an upright seat frame, a cushion portion, a cover portion and an airbag assembly. The upright seat frame defines at least one upright seatback section and an outboard bolster section. The cushion portion covers at least a portion of each of the upright seatback section and the outboard bolster section of the upright seat frame. The cover portion covers the cushion portions along the upright seatback section and the outboard bolster section. The airbag assembly includes an attachment bracket and an inflatable airbag. The attachment bracket is attached to the outboard bolster section. The attachment bracket defines an attachment section that extends along an inboard surface of the outboard bolster section and a deflection surface extending from the attachment section with the inflatable airbag. The deflection surface is dimensioned and shaped such that upon deployment of the inflatable airbag the inflatable airbag is guided to move by the deflection surface in a forward deployment direction relative to the outboard bolster section and the upright seat frame.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
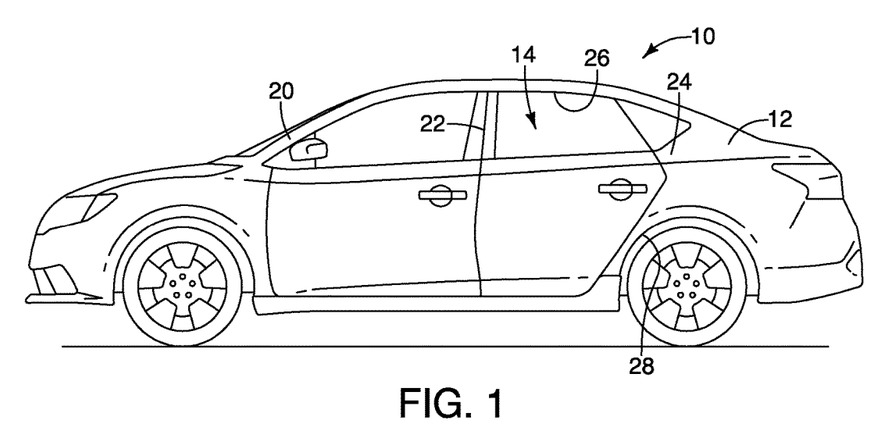
FIG. 1 is a side view of a vehicle having a passenger compartment with a rear seat assembly installed therein in accordance with a first embodiment.
Figure 2:
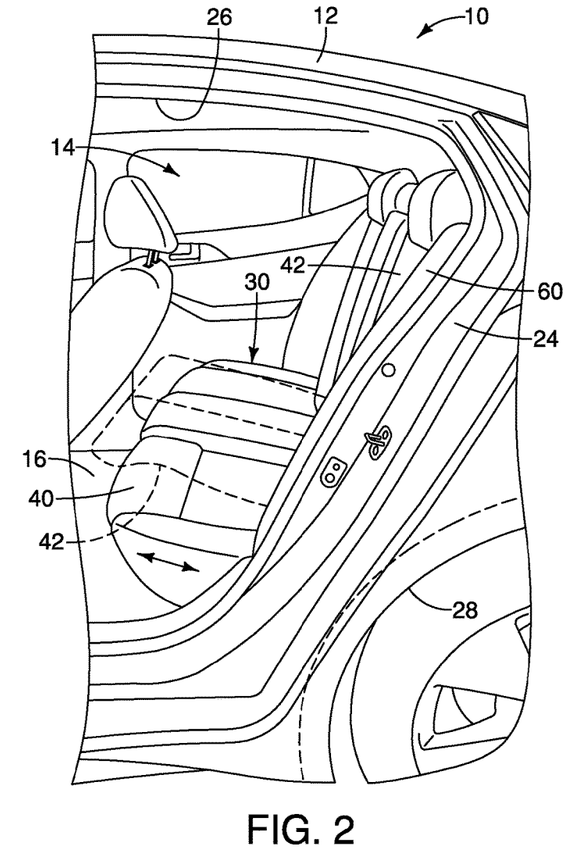
FIG. 2 is a side view of a rear portion of the vehicle depicted in FIG. 1 showing a rear seat assembly installed within the passenger compartment adjacent to and forward relative to a wheel well structure in accordance with the first embodiment.

Referring initially to FIGS. 1 and 2, a vehicle 10 that includes an airbag assembly 64 is illustrated in accordance with a first embodiment. A description of the air bag assembly 64 is provided below, following a description of portions of the vehicle 10.

The vehicle 10 includes a vehicle body structure 12 that defines a passenger compartment 14 with a floor 16 and a body side panel 18. The body side panel 18 further at least partially defines an A-pillar structure 20, a B-pillar structure 22, a C-pillar structure 24, a rear door opening 26 and a wheel well 28. Since A-pillar structures, B-pillar structures, C-pillar structures and wheel well structures of vehicles are conventional features, further description is omitted for the sake of brevity.

Figure 3:
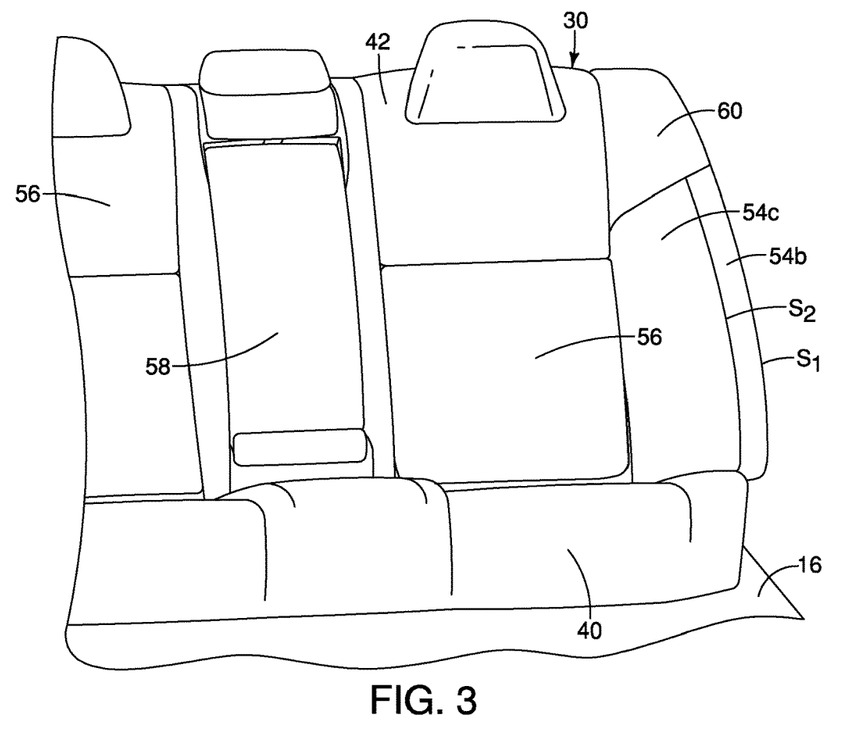
FIG. 3 is a front view of a portion of the passenger compartment of the vehicle showing the rear seat assembly with a cover stitched together forming at least one seam that allows an airbag assembly concealed behind the cover to inflate in accordance with the first embodiment.
Figure 4:
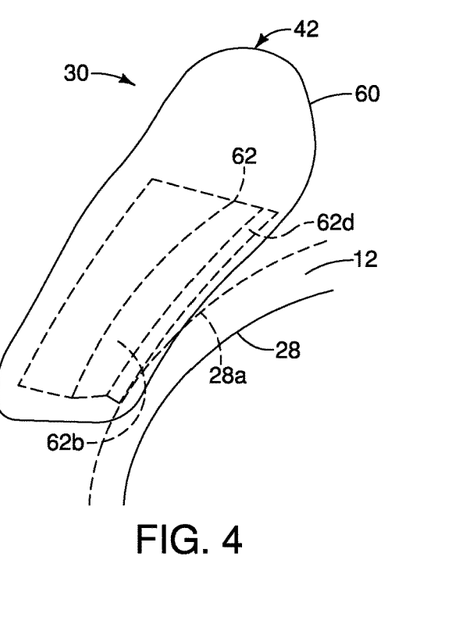
FIG. 4 is a schematic view of an outboard bolster section of the rear seat assembly and proximity to the wheel well structure of the vehicle in accordance with the first embodiment.

The rear door opening 26 is defined between the B-pillar structure 22 and the C-pillar structure 24. Within the passenger compartment 14, a rear seat assembly 30 is installed and is accessed via the rear door opening 26, as shown in FIGS. 2 and 3. As shown in FIG. 4, a portion of the rear seat assembly 30 is located adjacent to the wheel well 28. Specifically, the rear seat assembly 30 rests against or is in close proximity to an inner wheel well panel 28a. The airbag assembly 64 is installed within the rear seat assembly 30, as is described in greater detail below.

Figure 5:
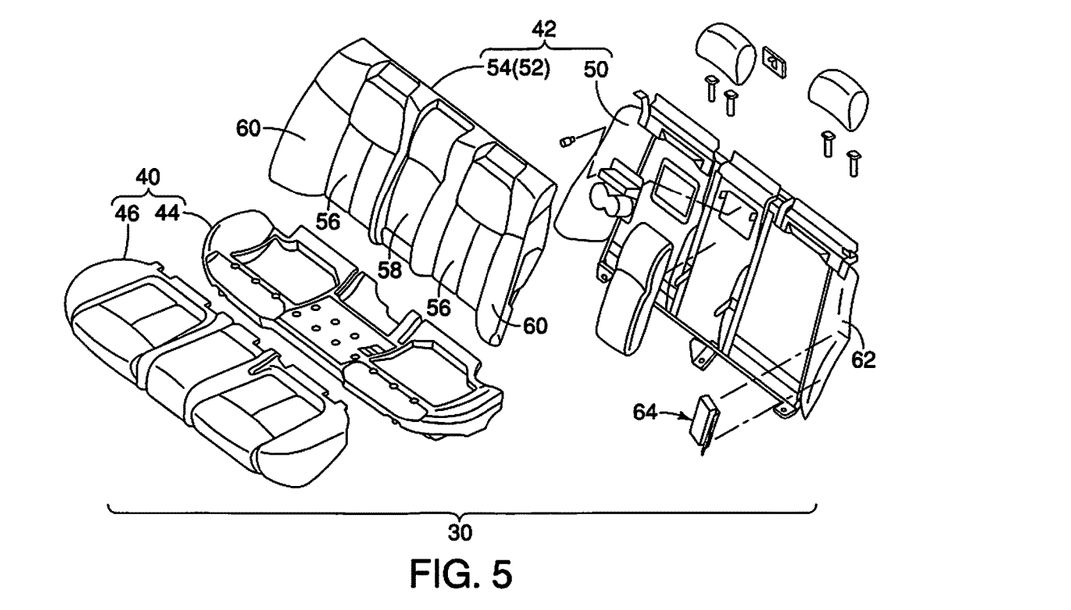
FIG. 5 is an exploded view of the rear seat assembly shown removed from the vehicle, showing frame and cover portions thereof in accordance with the first embodiment.
Figure 6:
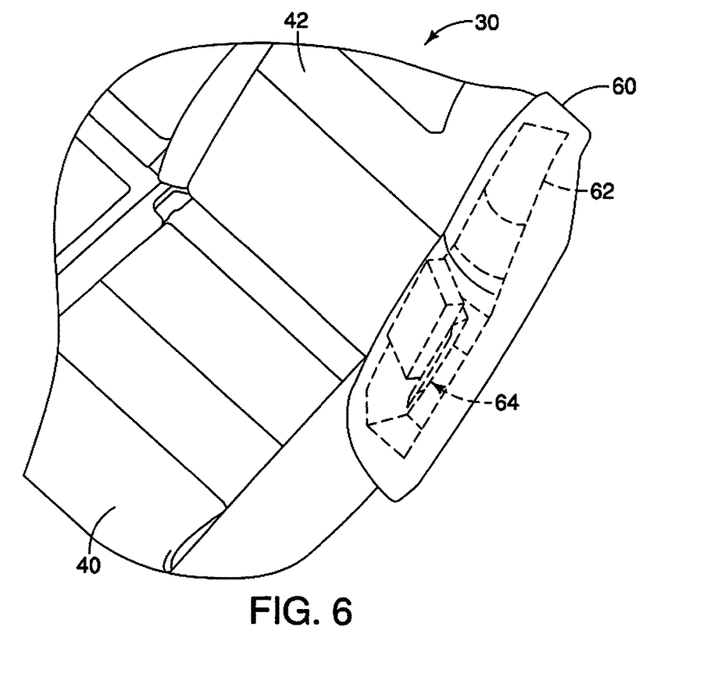
FIG. 6 is a perspective view of a portion of the rear seat assembly showing the outboard bolster section and an airbag assembly installed therein in accordance with the first embodiment.
Figure 7:
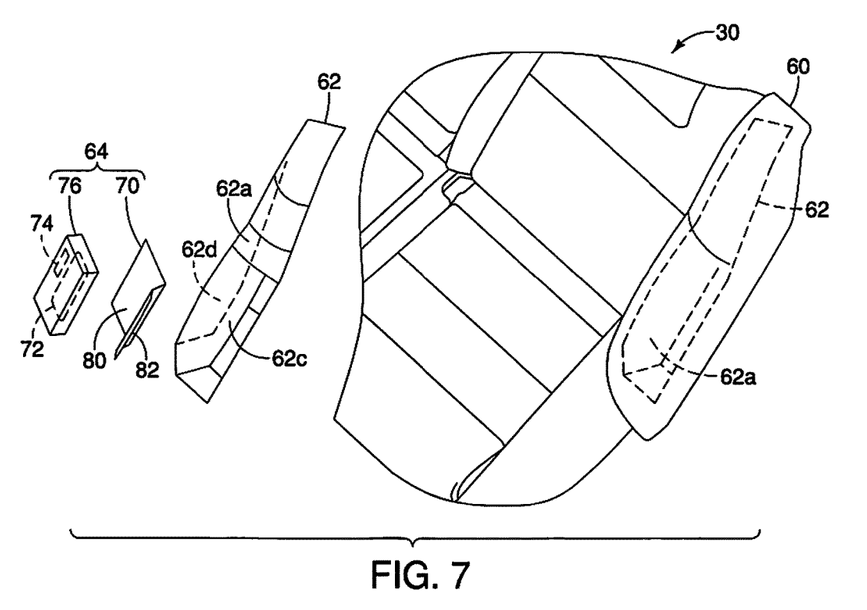
FIG. 7 is an exploded perspective view of the portion of the rear seat assembly depicted in FIG. 6 showing elements a bolster bracket of the rear seat assembly and elements of the airbag assembly such as an attachment bracket, a housing, an inflatable airbag and a deployment device in accordance with the first embodiment.

A description of the rear seat assembly 30 is now provided with initial reference to FIGS. 3-7. The rear seat assembly 30 basically includes a seating portion 40 and an upright seat section 42. In the first embodiment, the rear seat assembly 30 is a bench type seating assembly, not a single seat or bucket seat assembly. Therefore, in the first embodiment, the seating portion 40 is attached to the floor 16 within the passenger compartment 14 via, for example, mechanical fasteners (not shown) such that the seating portion 40 is non-movably installed within the vehicle 10. The seating portion 40 is oriented such that a majority of a passenger's weight is resting on the seating portion 40. In other words, the seating portion 40 is configured to support a passenger's buttocks and thighs with the passenger in a conventional seated orientation. As shown in FIG. 5, the seating portion 40 includes a frame portion 44 and a cover/cushion portion 46. Since seating portions of seat assemblies are conventional structures, further description of the seating portion 40 is omitted for the sake of brevity.

As shown in FIGS. 3 and 5, the upright seat section 42 includes an upright seat frame 50, a cushion portion 52 (shown in FIG. 8) and a cover portion 54. The upright seat frame 50, the cushion portion 52 and the cover portion 54 define seatback sections 56, a center section 58 and outboard bolster sections 60. The seatback sections 56 are located on either lateral side of the upright seat section 42 and are configured to support the lower and upper backs of two passengers. The center section 58 is located between the two seatback sections 56 and is also configured to support the back of a passenger, but can also be provided with a conventional fold down arm rest and optional cup holder.

The cover portion 54 (with the cushion portion 52 concealed therein) basically covers all of the upright seat frame 50 thereby defining the seatback sections 56, the center section 58 and the outboard bolster sections 60. As shown in FIG. 3, the cover portion 54 includes a plurality of cover sections such as the seatback section 56, the center section 58 and the bolster sections 60 that are stitched together defining a plurality of seams, such as a first upright seam $S_1$ and a second upright seam $S_2$. The bolster sections 60 include an outboard section 54a (FIGS. 13-15), an intermediate section 54b, an inboard section 54c (FIGS. 3 & 13-15). The first upright seam $S_1$ is defined along an outboard-most area of the outboard bolster section 60 joining the outboard bolster section 54a and intermediate bolster section 54b. The second upright seam $S_2$ is located adjacent to, but inboard of the first upright seam $S_1$ joining the intermediate bolster section 54b with the inboard bolster section 54c. As is described in greater detail below, the strength of the stitching in each of the first upright seam $S_1$ and the second upright seam $S_2$ is predetermined in cooperation with the airbag assembly 64. Specifically, the first upright seam $S_1$ is constructed with a first level of strength in order to resist splitting. The second upright seam $S_2$ is provided with a second level of strength to resist splitting that less than the first level. In other words, when equal levels of force are applied to each of the first upright seam $S_1$ and the second upright seam $S_2$, the second upright seam $S_2$ will intentionally split or open up before the first upright seam $S_1$ opens up.

The outboard bolster sections 60 are located on opposite lateral sides of the upright seat section 42, extending between a corresponding one of the seatback sections 56 and its adjacent rear door. In the first embodiment, the rear seat assembly 30 is a bench type seating assembly, not a single seat or bucket seat assembly. However, it should be understood from the drawings and the description herein that the present disclosure also applies to single seat assemblies or bucket seat assemblies. As stated above, in the first embodiment, the seating portion 40 is non-movably installed to the floor 16 of the vehicle 10. However, in an alternative embodiment, the seat cushion section 40 is coupled to the floor 16 such that the seat cushion section 40 is adjustably movable to a plurality of positions relative to the floor 16 as indicated by the arrow in FIG. 2 in a conventional manner. In the alternative embodiment, the upright seat frame 42 is attached to the seat cushion section 40 for pivoting movement such that the upright seatback section 42 and the corresponding outboard bolster section 60 are movable between at least an upright orientation shown in solid lines in FIG. 2 and an inclined orientation relative to the seat cushion section 40, as shown in phantom lines in FIG. 2.

Since the outboard bolster sections 60 are identical to one another (except that they are symmetrical mirror images of one another), description of one of the outboard bolster sections 60 applies equally to the other of the outboard bolster sections 60. Hence, only one of the outboard bolster sections 60 (and corresponding air bag assembly 64) is provided for the sake of brevity.

Figure 9:
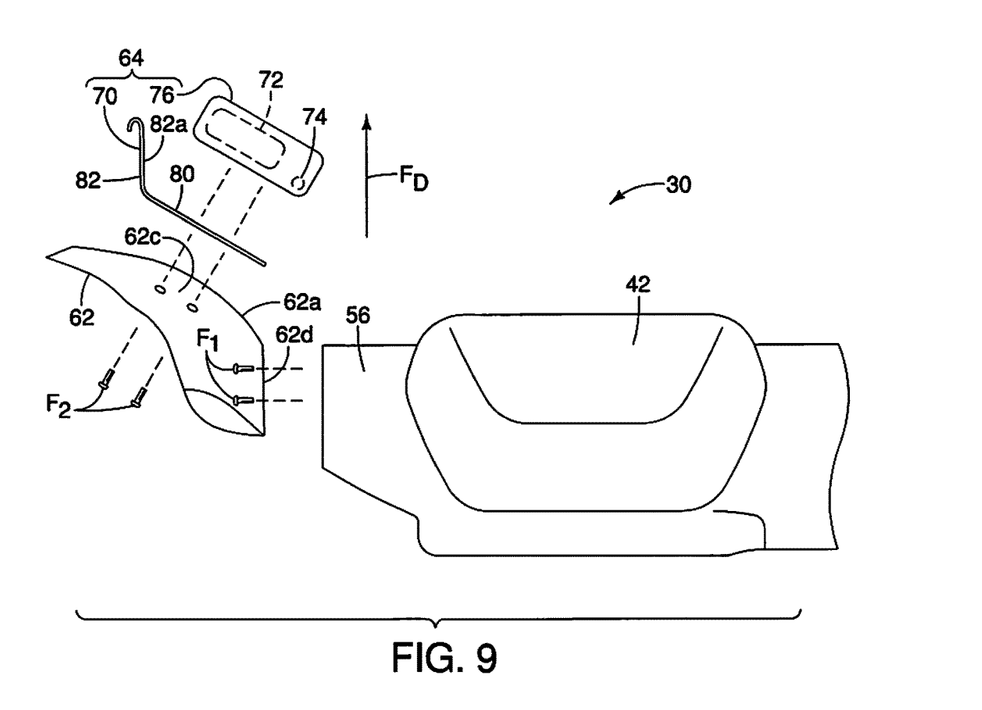
FIG. 9 is an exploded top view of the portion of the rear seat assembly depicted in FIG. 8 showing the bolster bracket, the attachment bracket and the inflatable airbag in accordance with the first embodiment.

The outboard bolster section 60 is defined by a bolster bracket 62, as well as the outboard section 54a, the intermediate section 54b and the inboard section 54c, of the cover portion 54. Specifically, the bolster bracket 62 is fixed to the upright seat frame 50 in a conventional manner, such as with mechanical fasteners $F_1$ as shown in FIG. 9. Alternatively, the bolster bracket 62 can be welded to the upright seat frame 50 or otherwise formed therewith in, for example, a metal stamping process.

Figure 8:
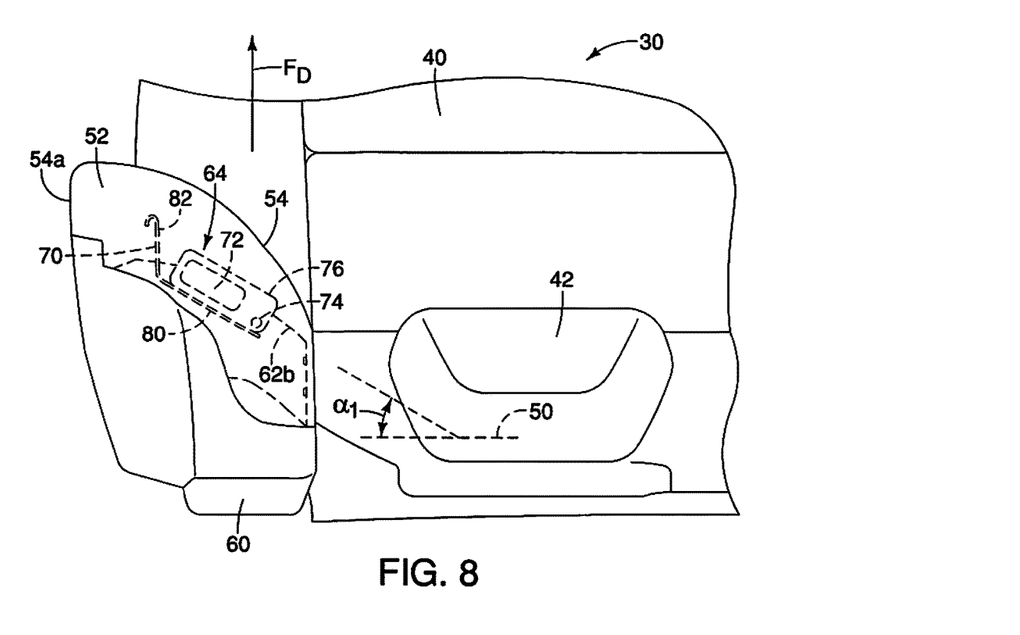
FIG. 8 is a top view of the portion of the rear seat assembly depicted in FIGS. 6 and 7 showing the relationships between the bolster bracket, the attachment bracket and the inflatable airbag in accordance with the first embodiment.

As shown in FIG. 8, the bolster bracket 62 is covered by the cushion portion 52 (a cushion material) and the cover portion 54. As shown in FIGS. 5-9, the outboard bolster sections 60 is also provided with the airbag assembly 64.

The bolster bracket 62 is a contoured panel that has many different surface sections that assist in the overall definition and shape of the outboard bolster section 60, and support of the airbag assembly 64. For example, as shown in FIGS. 8 and 9, the bolster bracket 62 has an inboard surface 62a that has an overall convex shape and an outboard surface 62b that has an overall concave shape. Along the inboard surface 62a, the bolster bracket 62 includes a generally planar area 62c that is shaped to receive and support the airbag assembly 64. The bolster bracket 62 also includes a generally planar section 62d at an inboard-most area thereof that mates with an outboard side of the upright seat frame 50. Specifically, the mechanical fasteners $F_1$ pass through apertures (not shown) in the planar section 62d and into the upright seat frame 50, thereby rigidly attaching the bolster bracket 62 to the upright seat frame 50.

As shown in FIG. 4, the outboard bolster section 60, and in particular, the bolster bracket 62, are shaped so as to avoid or minimize contact with the inner wheel well panel 28a. In other words, rearward facing surfaces (i.e., the outboard surfaces) of the bolster bracket 62 and the outboard bolster section 60 are concave shaped so that the rear seat assembly 30 can be installed at a rearward most location relative to the wheel well 28 in order to maximize legroom forward of the rear seat assembly 30 (maximize space between front and rear seats). Hence, the bolster bracket 62 (and the outboard bolster section 60) having an overall concave shape along rearward outboard surfaces thereof adjacent to the inner wheel well panel 28a, allow for rearward most positioning of the rear seat assembly 30.

A description of the airbag assembly 64 is now provided with reference to FIGS. 5-15.

The airbag assembly 64 basically includes an attachment bracket 70, an inflatable airbag 72 and a deployment device 74, with the inflatable airbag 72 and the deployment device 74 being contained within a housing 76.

The attachment bracket 70 and the housing 76 are attached to the bolster bracket 62 of the outboard bolster section 60 via fasteners $F_2$ (FIG. 9). Specifically, the attachment bracket 70 includes an attachment section 80 and a deflection section 82, each having an overall planar shape. The attachment section 80 is a generally planar panel portion that includes apertures (not shown) that receive the fasteners $F_2$ installed through apertures in the planar area 62c of the bolster bracket 62, through the attachment section 80 and into the housing 76.

The attachment bracket 70 includes an inboard side 70a and an outboard side 70b. Once installed, the attachment section 80 of the attachment bracket 70 extends along the planar area 62c of the inboard surface 62a of the bolster bracket 62 within the outboard bolster section 60. As shown in FIGS. 8 and 9, the housing 76 is further installed to the inboard side 70a of the attachment bracket 70.

The deflection section 82 of the attachment bracket 70 extends in a vehicle forward direction $F_D$ from the attachment section 80. The deflection section 82 defines a deflection surface 82a along the inboard side 70a of the attachment bracket 70. The deflection surface 82a extends forward from the attachment section 80.

Figures 10, 11:
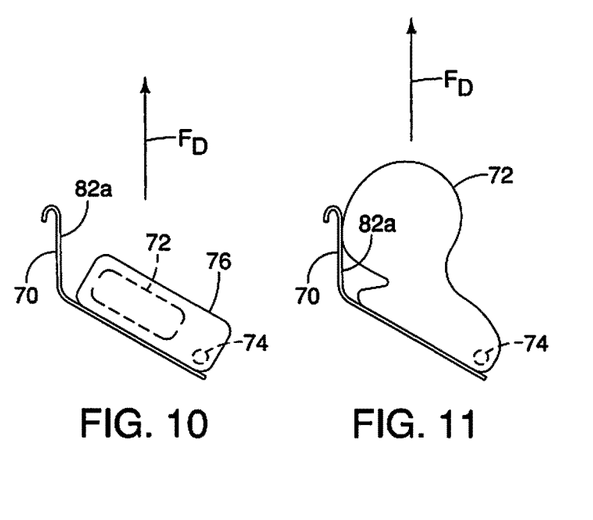
FIG. 10 is a top schematic view of attachment bracket and the inflatable airbag removed from the rear seat assembly and shown in an unused state prior to inflation in accordance with the first embodiment.
FIG. 11 is another top schematic view of attachment bracket and the inflatable airbag, similar to FIG. 10, showing the inflatable airbag in an initial stage of deployment as the inflatable airbag begins to inflate in accordance with the first embodiment.
Figure 12:
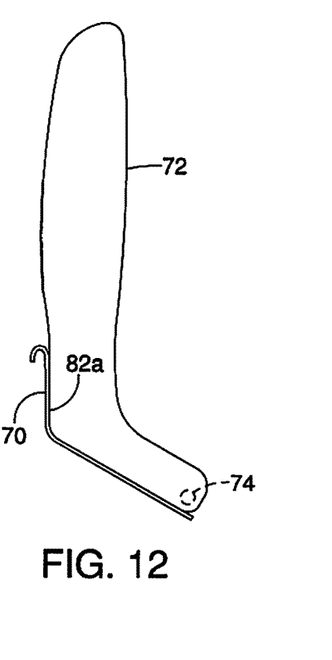
FIG. 12 is still another top schematic view of attachment bracket and the inflatable airbag, similar to FIGS. 10 and 11, showing the inflatable airbag in a fully inflated stage of deployment in accordance with the first embodiment.

As is shown initially in FIGS. 10-12, the deflection surface 82a is a generally planar surface that is dimensioned and shaped such that upon deployment of the inflatable airbag 72, the inflatable airbag 72 is guided to move by the deflection surface 82a in a forward deployment direction (corresponding to the vehicle forward direction $F_D$) relative to the outboard bolster section 60 and the upright seat frame 50. Further, the deflection surface 82a restricts expansion and inflation of the inflatable airbag 72 in an outboard direction, at least during the initial milliseconds of deployment of the inflatable airbag 72.

Specifically, as shown in FIG. 10 prior to inflation, the inflatable airbag 72 is secured within the housing 76. In FIG. 11, in the first few milliseconds of deployment, the inflatable airbag 72 starts to inflate, causing the housing 76 to open (the housing 76 is removed from FIGS. 11 and 12 for the sake of clarity). In the initial moments of the inflation process, the inflatable airbag 72 contacts the deflection surface 82a. Contact between the inflatable airbag 72 and the deflection surface 82a prevents further movement of the inflatable airbag 72 in the vehicle outboard direction and further urges the inflatable airbag 72 to inflate in the vehicle forward direction $F_D$. In FIG. 12 as the inflatable airbag 72 completes the inflation process, the inflatable airbag 72 is shown extending fully in the vehicle forward direction $F_D$.

As shown in FIG. 8, the upright seat frame 50 of the upright seatback section 42 an overall flat area that extends side to side in a vehicle lateral direction. The attachment section 80 extends away from the upright seat frame 50 at an angle α relative to the vehicle forward direction $F_D$. The angle α can be anywhere from between 20° and 40°. However, the angle α can be limited to between 25° and 35°. In the depicted embodiment, the angle α is approximately 30°.

Figure 13:
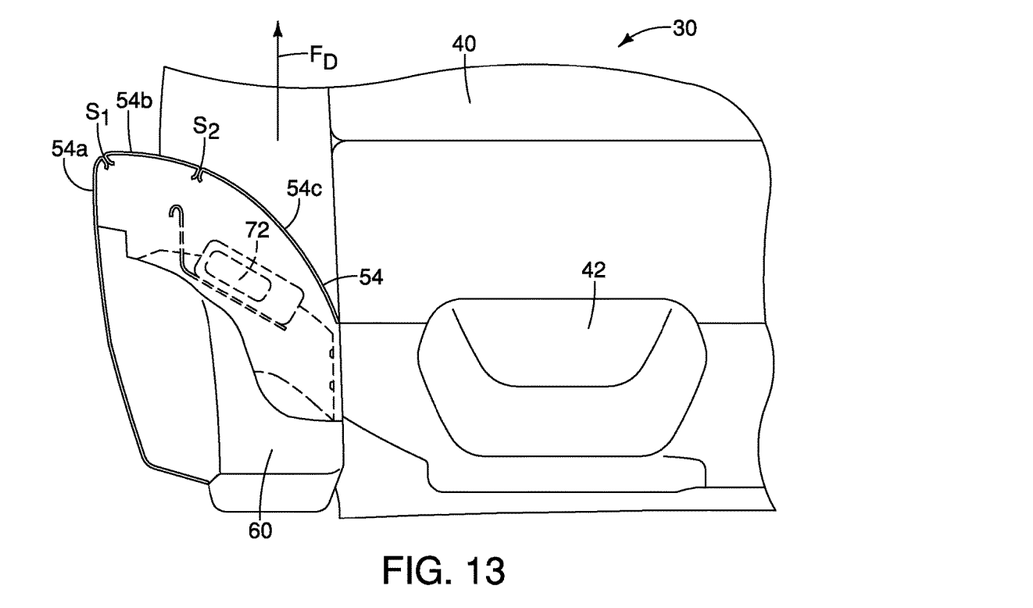
FIG. 13 is a top schematic view of the portion of the rear seat assembly including the outboard bolster section showing the attachment bracket and the inflatable airbag in an unused state prior to inflation in accordance with the first embodiment.
Figure 14:
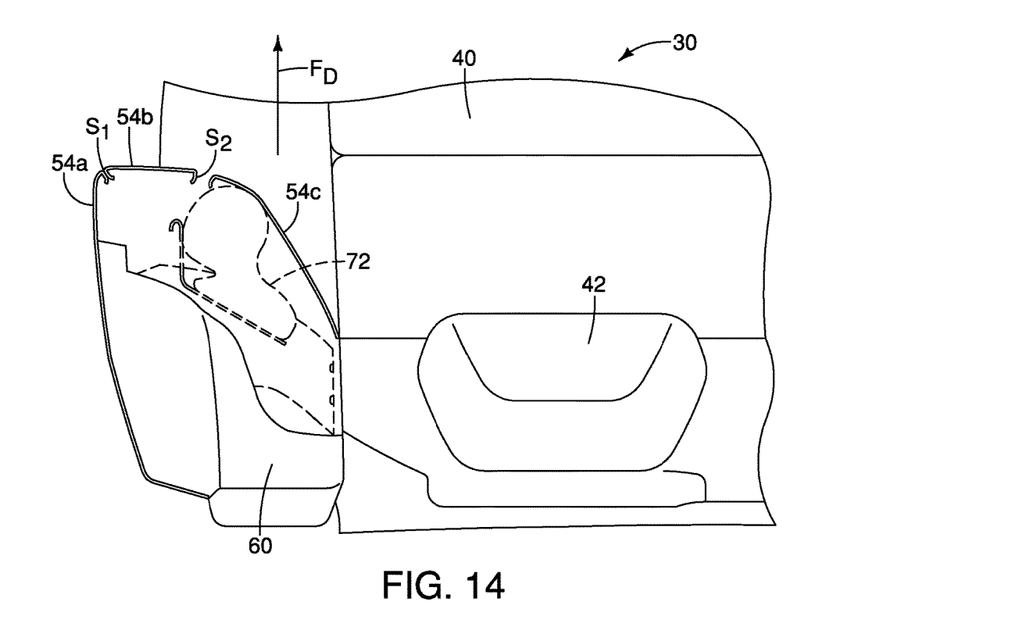
FIG. 14 is another top schematic view of the portion of the rear seat assembly including the outboard bolster section showing the inflatable airbag in an initial stage of deployment as the inflatable airbag begins to inflate and open the seam in the cover portion in accordance with the first embodiment.
Figure 15:
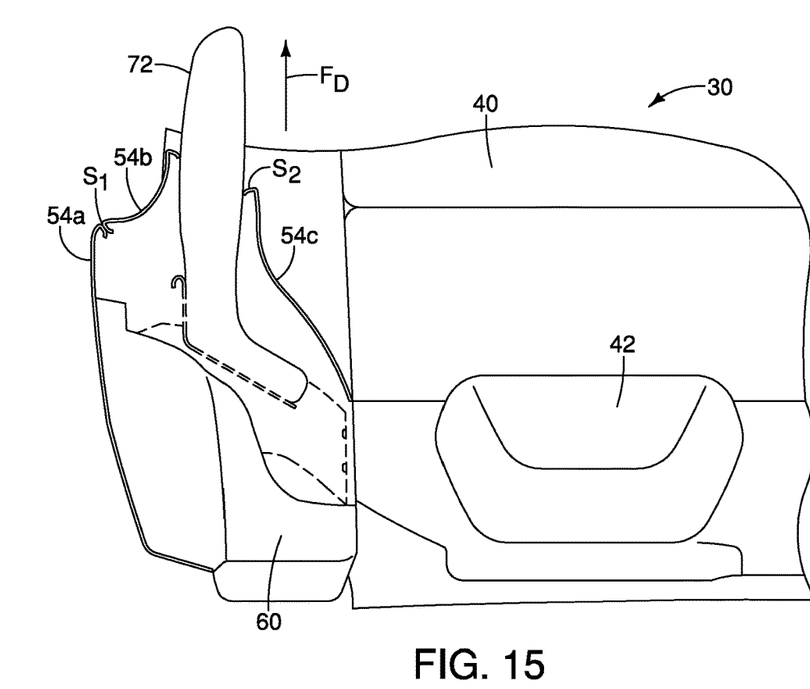
FIG. 15 is another top schematic view of the portion of the rear seat assembly including the outboard bolster section showing the inflatable airbag showing the inflatable airbag in a fully inflated stage of deployment extending through the open seam in the cover portion in accordance with the first embodiment.

To illustrate the effects of the presence of the deflection surface 82a and its orientation on the inflation process of the inflatable airbag 72, the inflation process is also shown schematically in FIGS. 13-15 with surrounding portions of the rear seat assembly 30 depicted for reference. Further, as shown in FIGS. 13-15, the cover portion 54 is configured to respond to inflation of the inflatable airbag 72 via the relationships with the seams $S_1$ and $S_2$, formed along the cover portion 54. As shown in FIG. 3, the seams $S_1$ and $S_2$ are vertically oriented and are subtle in appearance being decorative. However, as explained above, at least one of the seams $S_1$ and $S_2$ is specifically arranged to accommodate the inflation process of the inflatable airbag 72. Specifically, the seam $S_1$ is constructed with a greater resistance to splitting open than is the second seam $S_2$. In other words, when the same amount of force is applied to each of the first seam $S_1$ and the second seam $S_2$, the second seam $S_2$ will open up or split before the first seam $S_1$.

As shown in FIG. 13 prior to inflation, the inflatable airbag 72 is secured within the housing 76 and within the outboard bolster section 60. In FIG. 14, in the first few milliseconds of deployment, the inflatable airbag 72 starts to inflate, causing the housing 76 to open. In the initial moments of the inflation process, the inflatable airbag 72 contacts the deflection surface 82a such that contact between the inflatable airbag 72 and the deflection surface 82a prevents movement of the inflatable airbag 72 in the vehicle outboard direction, urging the inflatable airbag 72 to inflate in the vehicle forward direction $F_D$. Consequently, a leading forward portion of the inflatable airbag 72 contacts the cover portion 54 in an area at, adjacent to or along the seam $S_2$. Contact between the cover portion 54 and the inflatable airbag 72 causes the seam $S_2$ to split, separating the intermediate section 54b from the inboard section 54c, thereby opening the cover portion 54 and allowing the inflatable airbag 72 to continue inflating unimpeded by the cover portion 54.

In FIG. 15 as the inflatable airbag 72 completes the inflation process, the cover portion 54 has moved out of the way allowing the inflatable airbag 72 to move fully in the vehicle forward direction $F_D$.

Second Embodiment

Figure 16:
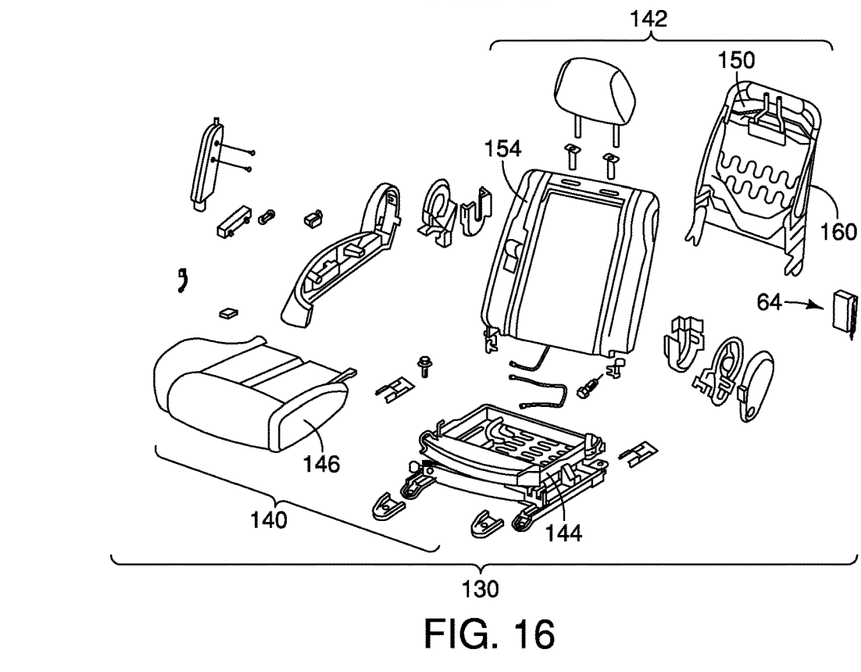
FIG. 16 is an exploded view of a rear seat assembly in accordance with a second embodiment.
Figure 17:
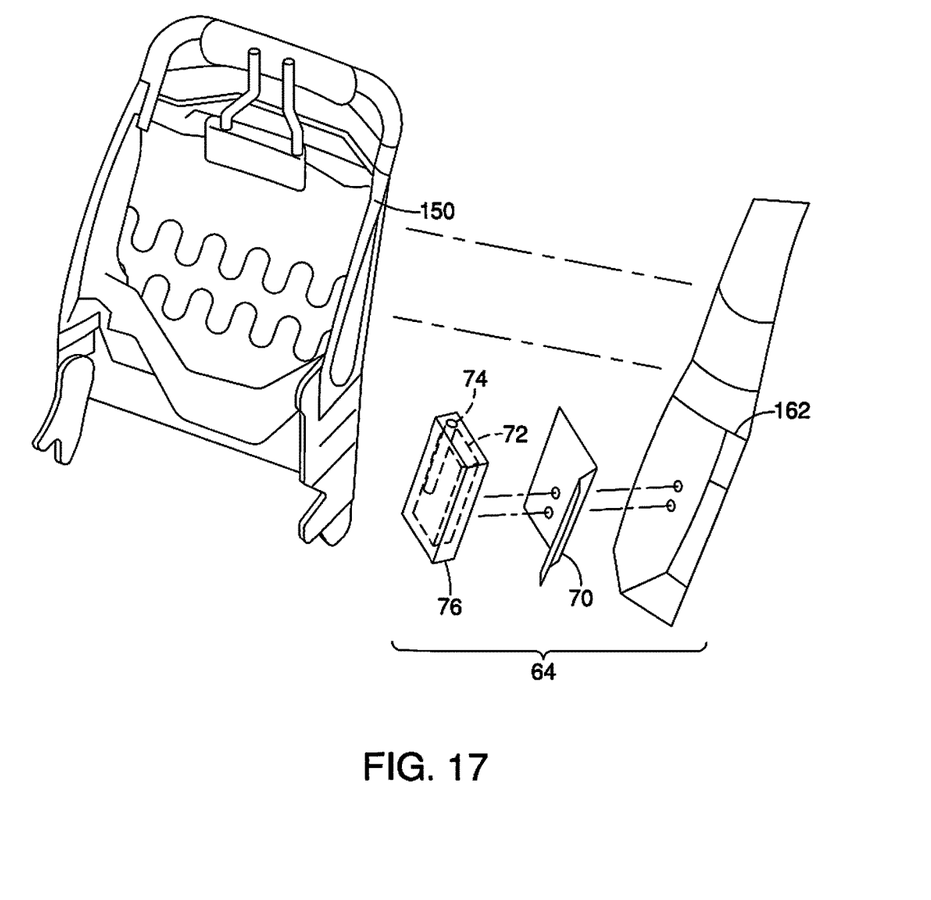
FIG. 17 is another exploded view of a portion of the rear seat assembly depicted in FIG. 16 in accordance with the second embodiment.

Referring now to FIGS. 16 and 17, a rear seat assembly 130 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the rear seat assembly 130 is a single seat or bucket seat that includes a seating portion 140 and an upright seat section 142 and the airbag assembly 64 (as described above with respect to the first embodiment).

The seating portion 140 that includes a frame portion 144 and a cover/cushion portion 146. The upright seat section 142 includes an upright seat frame 150, a cover portion 154 and the airbag assembly 64.

The rear seat assembly 130 can further include various conventional adjustment mechanisms, such as a front-rear positioning mechanism and a reclining mechanism that allows an upright seat frame 150 to be reclined relative to a frame portion 144 of the rear seat assembly 130.

In the second embodiment, the airbag assembly 64 is installed to a bolster bracket 162 that attaches to the upright seat frame 150 in a manner similar to that described above in the first embodiment. The bolster bracket 162 is identical to the bolster bracket 62 of the first embodiment, except that the overall size of the bolster bracket 162 can be smaller than the bolster bracket 62. However, the attachment of the airbag assembly 64 to the bolster bracket 162 is the same as the attachment to the bolster bracket 62 of the first embodiment. Further, the inflation features of the airbag assembly 64 as described above in the first embodiment apply equally to the second embodiment. Therefore, further description is omitted for the sake of brevity.

In the first embodiment, the frame portion 44 and the upright seat frame 50 are made of, for example, a plurality of sheet metal portions stamped, molded and/or otherwise welded together. In the second embodiment, the frame portion 144 and the upright seat frame 150 are made of, for example, a plurality of sheet metal portions combined with metal wire portions assembled in a conventional manner to define a frame of the rear seat assembly 130.

It should be understood from the drawings and the description herein that the airbag assembly 64 is triggered to inflate in a conventional manner. Specifically, the vehicle 10 can include various sensors and a controller that triggers deployment and inflation of the airbag assembly 64 in response to predetermined conditions, such as an impact event. The controller (not shown) preferably includes a microcomputer with an airbag deployment control program that controls the deployment of the airbag assembly 64. The controller can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the controller can be any combination of hardware and software that will carry out the functions of the present invention.

The various vehicle elements (other than the airbag assembly 64 and bolster bracket 62) are conventional components that are well known in the art. Since vehicle elements are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle seat and airbag structure. Accordingly, these terms, as utilized to describe the present invention should be interpreted relative to a vehicle equipped with the vehicle seat and airbag structure.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle seat and airbag structure comprising:
   an upright seat frame defining at least one upright seatback section and an outboard bolster section, the upright seatback section of the upright seat frame including an overall flat area that extends side to side in a vehicle lateral direction;
   a cushion portion covering at least a portion of each of the upright seatback section and the outboard bolster section of the upright seat frame;

a cover portion covering the cushion portion along the upright seatback section and the outboard bolster section; and an airbag assembly including an attachment bracket and an inflatable airbag, the attachment bracket being attached to the outboard bolster section, the attachment bracket defining an attachment section that extends along an inboard surface of the outboard bolster section and a deflection surface extending from the attachment section with the inflatable airbag, the deflection surface being dimensioned and shaped such that upon deployment of the inflatable airbag the inflatable airbag is guided to move by the deflection surface in a forward deployment direction relative to the outboard bolster section and the upright seat frame, the attachment section extending away from the upright seat frame in a vehicle forward direction at an angle of between 20° and 40° relative to the overall flat area of the upright seat frame and the deflection surface extending outboard of the airbag assembly and in a vehicle forward direction from a forward end of the attachment section.

2. The vehicle seat and airbag structure according to claim 1, wherein
the attachment section extends away from the upright seat frame in the vehicle forward direction at an angle of between 25° and 35° relative to the overall flat area of the upright seat frame.

3. The vehicle seat and airbag structure according to claim 2, wherein
the attachment section extends away from the upright seat frame in the vehicle forward direction at an angle of between 30° and 35° relative to the overall flat area of the upright seat frame.

4. The vehicle seat and airbag structure according to claim 1, wherein
the attachment section has an overall planar shape and the deflection surface has an overall planar shape.

5. The vehicle seat and airbag structure according to claim 1, wherein
the cover portion includes a plurality of cover sections that are stitched together such that a first upright seam is defined between adjacent ones of the cover sections along a leading area of the outboard bolster section aligned with a deployment direction of the airbag assembly.

6. The vehicle seat and airbag structure according to claim 5, wherein
the cover portion includes a second upright seam defined along an area of the bolster outboard of the first upright seam.

7. The vehicle seat and airbag structure according to claim 1, wherein
the upright seat frame includes a plurality of sheet metal portions.

8. The vehicle seat and airbag structure according to claim 1, wherein
the upright seat frame includes a plurality of metal wire portions.

9. A vehicle comprising:
a vehicle body structure defining a passenger compartment with a floor and a side panel defining a wheel well and rear door opening that is open to the passenger compartment; and
the vehicle seat and airbag structure according to claim 1 installed within the passenger compartment with the upright frame being fixedly and non-movably coupled to the vehicle body structure.

10. The vehicle according to claim 8 wherein
the attachment bracket of the airbag assembly defines a rearward facing surface that is dimensioned and shaped such that the rearward facing surface and the outboard bolster section of the cushion portion are spaced apart from the wheel well.

11. A vehicle comprising:
a vehicle body structure defining a passenger compartment with a floor and a side panel defining rear door opening that is open to the passenger compartment;
an upright seat frame defining at least one upright seatback section and an outboard bolster section;
a cushion portion covering at least a portion of each of the upright seatback section and the outboard bolster section of the upright seat frame;
a cover portion covering the cushion portion along the upright seatback section and the outboard bolster section; and
an airbag assembly including an attachment bracket and an inflatable airbag, the attachment bracket being attached to the outboard bolster section, the attachment bracket defining an attachment section that extends along an inboard surface of the outboard bolster section and a deflection surface extending from the attachment section with the inflatable airbag, the deflection surface being dimensioned and shaped such that upon deployment of the inflatable airbag the inflatable airbag is guided to move by the deflection surface in a forward deployment direction relative to the outboard bolster section and the upright seat frame,
the seat cushion section being coupled to the floor such that the seat cushion section is adjustably movable to a plurality of positions relative to the floor, with the upright seat frame being attached to the seat cushion section for pivoting movement such that the upright seatback section and the outboard bolster section are movable between at least an upright orientation and an inclined orientation relative to the seat cushion section.

12. The vehicle seat and airbag structure according to claim 11, wherein
the cover portion includes a plurality of cover sections that are stitched together such that a first seam is defined between adjacent ones of the cover sections along a leading area of the outboard bolster section aligned with a deployment direction of the airbag assembly.

13. A vehicle seat and airbag structure comprising:
an upright seat frame defining at least an upright seatback section and an outboard bolster section the upright seat frame corresponding to the upright seatback section defines an overall flat area that extends side to side in a vehicle lateral direction;
a cushion portion covering at least a portion of each of the upright seatback section and the outboard bolster section of the upright seat frame;
a cover portion covering the cushion portions along the upright seatback section and the outboard bolster section; and
an airbag assembly including an attachment bracket and an inflatable airbag, the attachment bracket being attached to the outboard bolster section, the attachment bracket defining an attachment section that extends along an inboard surface of the outboard bolster section and a deflection surface extending from the attachment section with the inflatable airbag being attached to an inboard side of the attachment section, the deflection surface being dimensioned and shaped such that upon deployment of the inflatable airbag the inflatable airbag is initially prevented from moving in an outboard direction relative to the outboard bolster section of the upright seat frame by the deflection surface, the attachment section extending away from the upright seat frame in a vehicle forward direction at an angle of between 20° and 40° relative to the overall flat area of the upright seat frame and the deflection surface extends outboard of the airbag assembly and in a vehicle forward direction from a forward end of the attachment section.

14. The vehicle seat and airbag structure according to claim 13, wherein
the deflection surface is further dimensioned and shaped such that upon deployment of the inflatable airbag the inflatable airbag is guided to move in a forward deployment direction relative to the outboard bolster section of the upright seat frame by the deflection surface.

15. The vehicle seat and airbag structure according to claim 13, wherein
the attachment section extends away from the upright seat frame in the vehicle forward direction at an angle of between 25° and 35° relative to the overall flat area of the upright seat frame.

16. The vehicle seat and airbag structure according to claim 15, wherein
the attachment section extends away from the upright seat frame in the vehicle forward direction at an angle of between 30° and 35° relative to the overall flat area of the upright seat frame.

17. The vehicle seat and airbag structure according to claim 12, wherein
the cover portion includes a second seam defined along an area of the bolster outboard of the first seam.

* * * * *